(12) United States Patent
Phyo et al.

(10) Patent No.: US 8,838,543 B2
(45) Date of Patent: Sep. 16, 2014

(54) ARCHIVING SYSTEM THAT FACILITATES SYSTEMATIC CATALOGUING OF ARCHIVED DOCUMENTS FOR SEARCHING AND MANAGEMENT

(75) Inventors: Gabrielle Sarah Phyo, Newbury (GB); Nickola John Vidovich, Newbury (GB); Elizabeth Foster, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 420 days.

(21) Appl. No.: 12/927,693

(22) Filed: Nov. 19, 2010

(65) Prior Publication Data

US 2011/0145202 A1 Jun. 16, 2011

(30) Foreign Application Priority Data

Nov. 20, 2009 (GB) .................................. 0920339.9

(51) Int. Cl.
*G06F 17/00* (2006.01)
*G06Q 10/00* (2012.01)
*G06F 17/30* (2006.01)

(52) U.S. Cl.
CPC .......... *G06F 17/30011* (2013.01); *G06Q 10/00* (2013.01)
USPC ....................................................... 707/662

(58) Field of Classification Search
USPC ................................................ 707/694, 695
See application file for complete search history.

(56) References Cited

U.S. PATENT DOCUMENTS

| | | | | |
|---|---|---|---|---|
| 5,813,009 | A * | 9/1998 | Johnson et al. | 707/695 |
| 6,396,964 | B1 * | 5/2002 | Altman | 382/306 |
| 7,805,472 | B2 * | 9/2010 | DeBie | 707/829 |
| 2001/0036324 | A1 * | 11/2001 | Altman | 382/305 |
| 2004/0267595 | A1 * | 12/2004 | Woodings et al. | 705/9 |
| 2006/0217999 | A1 | 9/2006 | Collard et al. | |

FOREIGN PATENT DOCUMENTS

WO  WO 01/93081  12/2001

* cited by examiner

*Primary Examiner* — Rehana Perveen
*Assistant Examiner* — Hung Havan
(74) *Attorney, Agent, or Firm* — Muirhead and Saturnelli, LLC

(57) ABSTRACT

An archiving system for enabling searching for collections of items is disclosed. A processing unit displays an archived items collection management template in respect of a particular collection of items and prompts a user to complete the template fields with data obtained by the user from manually reviewing that collection of items to capture information relevant to each of the template fields. An archiving controller stores, in pre-determined data fields of a storage area of a data store corresponding to said collection of items, the data from the completed template fields. A document search controller may search the pre-determined data fields of the storage areas of the data store corresponding to each of the collections of items to identify ones of the collection of items which match search criteria.

18 Claims, 9 Drawing Sheets

| 1. Cataloguer's Identity | John Smith |
|---|---|
| 2. Bar-code |  |
| 3. Box Details | o None<br>o Enter free text |
| 4. Box content description | o Select type of item  Number of items: |

*Fig. 7A*

| Item type | o Document<br>o File<br>o Other | |
|---|---|---|
| Date range | Newest: __/__/__<br>Oldest: __/__/__ | |
| Country | o Select from list ^ | o Duplicate |
| Names | | o Duplicate |
| Subject line on memo document | | o Duplicate |
| Company names | | o Duplicate |
| Document types | o Select from list ^ | |
| Business area | o Select from list ^ | |
| Address/location | | o Duplicate |
| File owner/custodian SPOC | | |
| File title/name | | o Duplicate |
| Free text | | |
| Retention term | __/__/__ | |

*Fig. 7B*

ARCHIVING SYSTEM THAT FACILITATES SYSTEMATIC CATALOGUING OF ARCHIVED DOCUMENTS FOR SEARCHING AND MANAGEMENT

TECHNICAL FIELD

This application relates to an archiving system, method and computer program for enabling searching for collections of items, and more particularly, but not exclusively, to a system for facilitating systematic cataloguing of archived boxes of documents that enables reliable searching of the documents and automatic destruction of documents when they cease to have any relevance.

BACKGROUND TO THE INVENTION

Individuals, and particularly corporations, often generate a large amount of documentation. Such documentation may include personnel information, technical information, financial information and the like. Such documents may be used intensively whilst they have direct current relevance to the individual or corporation.

However, when a project is completed or abandoned, the documents relating to that project ceases to be of direct current relevance. It is common practice for such documents to be archived—for example, for the documents to be collected together and boxed, and put into storage. Typically, the documents are stored in a remote or less convenient location than the location of the documents when they were considered to be current. This is advantageous, as it frees up valuable office space where the documents were held previously whilst they were current. This may also have economic benefits as the storage location is generally at a location that is less expensive. Also, documents may be stored more densely at a storage location because it is specifically adapted for the storage of documents—for example, the storage location may include floor-to-ceiling racks for the storage of documents that are closely spaced within a warehouse.

When documents are current they are typically stored in files that hold a plurality of documents which have some relationship which each other. For example, documents relating to a particular project, or aspect of a project, may be held in the same file. By way of a particular example, records relating to the employment of a particular person may be held on a single file, such records including documents from their initial application for the job (e.g. curriculum vitae, covering letter, evidence of qualification, and a record of the interviews conducted), copy of the contract of employment, details of regular appraisals performed during employment, details of salary and changes to salary, disciplinary matters, and documents relating to the termination of employment.

For the sake of convenient handling, a plurality of files to be archived are often accumulated in a single container or box, and the container is sent to storage when it is full, or on the occurrence of other criteria. The accumulated items can be considered to be a collection of items. Typically the items in the box are related in some way. For example, all the items may have been issued by a single person or corporate department. A record of the name (file reference) of the files stored in the container is typically made, so that, subsequently, the box in which a particular file is stored can be identified in the storage location, and the file retrieved if the file reference is known.

The storing of documents does incur considerable expense. A corporation may accumulate an increasing quantity of archived documents over a period of time. Deciding when to destroy archived documents is conventionally very problematical. Often the personnel originally responsible for the document may have left the corporation or may have been assigned to other duties. There may be no person with a direct interest in the document. However, it may be necessary to retain the documents for legal or business reasons. Therefore, there is a tendency for documents to be retained once they have been archived, leading to a steady increase in the requirement for document storage over a period of time, and associated increasing costs.

A significant problem with archived documents is that the documents may be relevant to current or future (unknown) legal proceedings, where the documents must be disclosed as part of the "discovery" procedure. Briefly, such a discovery procedure is typically the pre-trial disclosure of documents containing information relevant to an opposing party in a legal action. Penalties for destroying relevant documents can be severe, even if this is done inadvertently.

When legal action is initiated, conventionally a responsible lawyer will define a Document Preservation Notice (DPN) which explains the subject-matter of the litigation. This may be a narrative. The DPN is provided to paralegals or lawyers who manually read through documents (including archived documents), and who then identify documents relevant to the litigation based on their review of the documents and the DPN. Such a procedure is time-consuming and expensive. If more than one DPN is in force, it is difficult for a person to search for documents relevant to both DPNs simultaneously without becoming confused. Also, if the terms of a DPN are changed (e.g. because a new aspect is added to the litigation), the documents must all be manually reviewed again.

Also, after documents are archived, it may be difficult to identify relevant documents, whether for the purposes of discovery or otherwise, if it is desired to identify documents relating to a particular general subject area unless every archived document is reviewed. Such a difficulty arises because, when documents are archived, they are not catalogued in a consistent manner (or at all), making it difficult to identify a file unless the file reference is known. Each individual or department may catalogue documents according to different rules and to a different level of detail. For example, if litigation occurs that relates to subject matter that bridges across different departments (for example personnel/HR and logistics) a different search strategy may be required to search files originating from each of those departments, as they will have been catalogued in a very different way.

One known method for cataloguing documents, so that they can be searched and identified subsequently, is to use Optical Character Recognition (OCR). According to this method, each page of a document is scanned before storage, and OCR is used to digitise the text so that it is searchable by word. This allows the text of the documents to be searched. However, OCR is a time consuming and expensive process as every page of each document needs to be scanned and converted. Also, some items that go into storage may not be documents that can be scanned, such as drawings and hardware, and such documents would have to be categorised by different method. Further, OCR does not provide any indication of the context in which are word is used. Searching text for particular words tends to produce a large number of irrelevant "hits" because there is no way of excluding documents where the context in which the word is used makes it irrelevant.

Accordingly, it would be desirable to provide an apparatus, method and computer program for archiving documents such that documents that have ongoing importance can be readily identified, documents that need to be retained for legal reasons are preserved and documents that are no longer required and do not need to be retained for any other reason can be disposed of.

SUMMARY OF THE INVENTION

In a first aspect, the system described herein provides an archiving system for enabling searching for collections of items, the system comprising:

a data store having a plurality of storage areas, each of which relates to a respective collection of items and includes a plurality of pre-determined data fields, each for storing a particular type of information;

an input device having a display unit, an input unit and a processing unit, the display unit being operable to display, in the form of an image on a screen of the display unit, an archived items collection management template having a template field corresponding to each of the pre-determined data fields; and an archiving controller operable to control the transfer of data between the input device and the dale store; and a document search controller operable to search content of the data store in accordance with search criteria;

wherein the processing unit is operable to cause the display unit to display the archived items collection management template in respect of a particular one of the collections of items and to prompt a user to complete the template fields with data obtained by the user from manually reviewing that collection of items to capture information relevant to each of the template fields, the input unit being operable to receive the data obtained by the user;

wherein the archiving controller is operable to store, in the pre-determined data fields of a one of the storage areas of the data store corresponding to the collection of items, the data from the completed template fields; and wherein the document search controller is operable to search the pre-determined data fields of the storage areas of the data store corresponding to each of the collection of items to identify ones of the collection of items which match the search criteria.

Each collection of items may be a box of items. Such a box may be of a standard size, such as size 403 mm×303 mm×246 mm, although any size may be used. The use of consistently sized boxes is advantageous for efficient handling and storage of boxes. The items may be documents, papers, files or other material where information is printed or written onto paper or card. The items may also be hardware, such as prototypes, samples and data storage media such as magnetic and optical disks.

Further, the items may be documents stored in electronic form. Such documents will generally be stored on a data carrier such as a large-capacity hard disc but the physical carrier on which the documents are stored is not significant: the documents are not obtained by referring to a particular physical carrier but by a file name or some accessed identifier. A collection of such items may not be a physical collection of items in a box (or other physical store) but may be a logical collection—such as documents relating to a particular subject area or created by a particular author or group of authors. For example, a collection of such items may be items that a user would typically contain in one directory on their personal computer.

The search criteria may comprise keywords or a Boolean string comprising a one or more Boolean operators (e.g. "AND", "OR") and a plurality of keywords.

The document search controller may be operable to automatically derive the keywords or the Boolean string from search information provided by a user. This may be achieved by performing syntactic analysis of natural sentences entered by the user.

The search criteria may include aspects relevant to particular ones of the pre-determined data fields and the document search controller may be operable to search only the pre-determined data fields of the storage areas of the data store to which each aspect relates. For example, a pre-determined data field may be "country" (e.g. the country in which the document was created). If it is desired to search for only documents created in a particular country, then it is advantageous to search only the "country" field using the keyword (which may be a country name or code). If all fields are searched using that keyword, documents will be identified in the search that might relate to that country in some other way—such as describing the characteristics of that country. Searching only particular fields may improve the accuracy of the search.

The pre-determined data fields may include:
a data field for each collection that relates to the age of at least one item in the collection, and
an item category for field each collection that relates to the category of at least one item in the collection;
wherein the archiving system may include:
a database of recommended retention periods for each category of item, and
a calculation device that automatically calculates a disposal time for a collection of items based on the age of items in the collection, the category of items in the collection and the recommended retention period of items in the collection.

The data field for each collection that relates to the age of at least one item in the collection may store the oldest and/or newest date to which that item refers. For example, the item may be a file of granted patent certificates. The latest expiry date of the patents may be recorded. Such items may be categorised as patent certificates. The database of recommended retention periods may include a retention period of 6 years after expiry for patent certificates. The calculation device may automatically calculate a disposal time for a collection of items may calculate the disposal time as 6 years after the latest expiry date of the patents.

A collection of items will only be destroyed when the disposal times all the items in the collection have expired. Even then, destruction may not occur if there is a special reason to retain any of the items in the collection. In the embodiment to be described, documents are not destroyed if the are or potentially relevant to legal proceedings defined by a DPN.

The pre-determined data fields may include a responsible person field for each collection that relates to a person responsible of at least one item in the collection, and wherein the archiving system includes a notification device that automatically notifies the person responsible when destruction of the collection becomes appropriate based on the calculated disposal time for the collection. For example, an email may be automatically generated and sent to the person to notify them of impending destruction. Destruction may be delayed until the person's consent to destruction is received. Advantageously, if the person stored in the responsible person field is not available (e.g. because they have left the employment of the corporation), the system may link to a personnel/HR database to identify another suitable person, such as the original person's line manager.

The search terms may relate to legal proceedings (e.g. defined by a DPN), and the system may include a recording device that records in the storage area which relates to a collection of items in a pre-determined data field details of the search terms in use at the date of destruction of the collection of items. This provides an "audit trail" as evidence of the circumstances under which a document was destroyed—which may be useful if it later transpires that the document would have been relevant for some reason unknown at the time of destruction.

In a second aspect, the system described herein provides a method for enabling searching for collections of items, wherein:

a data store has a plurality of storage areas, each of which relates to a respective collection of items and includes a plurality of pre-determined data fields, each for storing a particular type of information;

an input device has a display unit, an input unit and a processing unit, the display unit operable to display, in the form of an image on a screen of the display unit, an archived items collection management template having a template field corresponding to each of the pre-determined data fields; and an archiving controller is operable to control the transfer of data between the input device and the date store; and a document search controller is operable to search content of the data store in accordance with search criteria;

the method including:

the processing unit causing the display unit to display the archived items collection management template in respect of a particular one of the collections of items and to prompt a user to complete the template fields with data obtained by the user from manually reviewing that collection of items to capture information relevant to each of the template fields, the input unit receiving the data obtained by the user; and the archiving controller storing, in the pre-determined data fields of a one of the storage areas of the data store corresponding to the collection of items, the data from the completed template fields;

such that the document search controller is able to search the pre-determined data fields of the storage areas of the data store corresponding to each of the collection of items to identify ones of the collection of items which match the search criteria.

In a third aspect, the system described herein provides computer program for enabling searching for collections of items, wherein:

a data store has a plurality of storage areas, each of which relates to a respective collection of items and includes a plurality of pre-determined data fields, each for storing a particular type of information;

an input device has a display unit, an input unit and a processing unit, the display unit operable to display, in the form of an image on a screen of the display unit, an archived items collection management template having a template field corresponding to each of the pre-determined data fields; and an archiving controller is operable to control the transfer of data between the input device and the date store; and a document search controller is operable to search content of the data store in accordance with search criteria;

the computer program including instructions for performing the following steps:

the processing unit causing the display unit to display the archived items collection management template in respect of a particular one of the collections of items and to prompt a user to complete the template fields with data obtained by the user from manually reviewing that collection of items to capture information relevant to each of the template fields, the input unit receiving the data obtained by the user; and the archiving controller storing, in the pre-determined data fields of a one of the storage areas of the data store corresponding to the collection of items, the data from the completed template fields;

such that the document search controller is able to search the pre-determined data fields of the storage areas of the data store corresponding to each of the collection of items to identify ones of the collection of items which match the search criteria.

The computer program may be stored and supplied on a computer program product, such as a magnetic tape or disc, an optical disc (e.g. CD- or DVD-ROM), on a memory device electronically (e.g. an EEPROM or USB memory stick), or on any other suitable product.

In another aspect the system described herein provides a method of assessing the relevancy of documents, they method including:

Cataloguing the documents,

Selecting relevancy criteria,

Converting the relevancy criteria into a Boolean string,

Applying the Boolean string to the catalogued documents, and

Automatically selecting the relevant documents in dependence on the Boolean string.

BRIEF DESCRIPTION OF THE DRAWINGS

Embodiments of the system described herein will now be explained by way of example, with reference to the accompanying drawings, in which:

FIGS. 7A and 7B show cataloguing input screens.

DETAILED DESCRIPTION OF VARIOUS EMBODIMENTS

Figure 1:
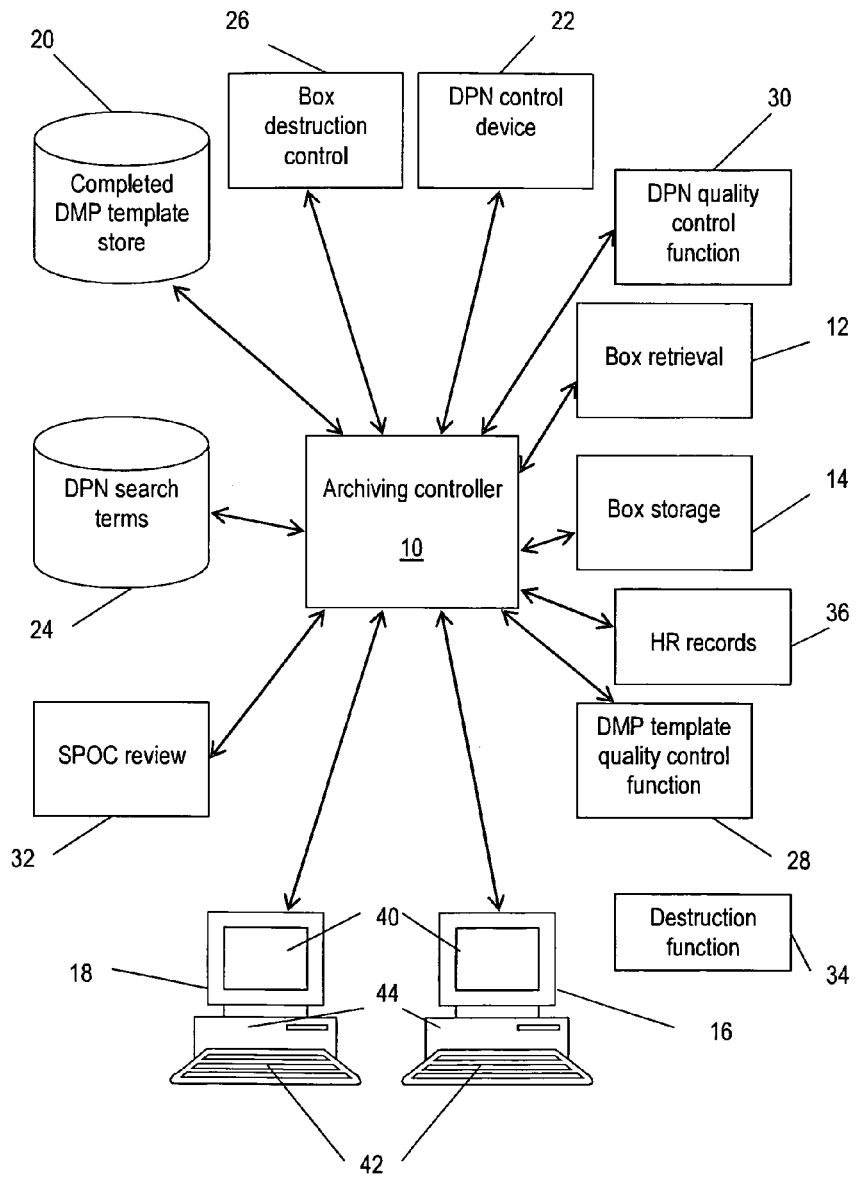
FIG. 1 shows the basic architecture of elements of the archiving system according to an embodiment of the system described herein.

According to an embodiment of the system described herein, a document management system is provided that enables the contents of collections (e.g. boxes) of archived items (e.g. documents and files) to be catalogued such that a Document Management Policy (DMP) can be applied. Such a DMP allows documents to be readily identified after archiving, and also allows compliance with Document Preservation Notices (DPNs), so that a determination can be made as to whether a box is potentially relevant to litigation or for any other reason. Conventional systems allow documents to be identified only by file reference. The cataloguing according the embodiment allows documents to be searched for and identified by other criteria, such as their general subject-matter.

The embodiment allows the records of all the catalogued items to be searched by using keywords or by constructing a Boolean string of keywords, or other criteria.

Once items are correctly catalogued, the aims are as follows: Items important to ongoing business activities can be readily identified, items that need to be retained for legal reasons are preserved, and items that are no longer required and do not need to be retained for any other reason can be disposed of.

The archived items are most often documents. The term "document" includes all forms of recorded communication, including, for example, drafts, handwritten or typed notes, diaries, internal memoranda, minutes of meetings and correspondence of any kind. It also includes all records stored electronically, such as computer files, the content of the team rooms and electronic mail. However, the archived items may be hardware items that might be stored in a box, such as mobile terminals. The following discussion mainly refers to documents, but the system described herein is also applicable to items in general.

User Types

In order for the system to be correctly used and administered roles will be created with varying permissions:

Intelligent Cataloguer

The intelligent cataloguer is hired as a contractor by the company to recreate file entries for legacy archived documentation.

Standard User Cataloguer

Generally an employee of the company, the standard user cataloguer is able to input current and future file details into the system.

Porter

This role is able to receive notifications and access the system for information purposes, i.e. this role will not be able to make any changes to the data.

Legal Super User (LSU)

The LSU is able to approve DPN attachment ("hold designation") to files and maintain a list of DPNs. When a LSU logs into the system, they are automatically authenticated to an appropriate level so that they can maintain the DPNs. LSUs will generally be lawyers or paralegals.

Administrator

The Administrator is able to do the same as the Standard and Legal Super User and also change any element of the archive record, e.g. the administrator will be able to change the name of the box owner, file custodian and file retention or destruction date. The Administrator is also able to access reporting functionality.

According to an important feature of the embodiment, the catalogue entry for each box of documents includes a logical structure having mandatory fields, referred to as a DMP template. The same structure (DMP template) is used for all boxes. The DMP template is displayable as a form on the user interface of a general purpose computer.

The archived documents are contained in boxes which are identifiable by any convenient mechanism, such as a unique barcode, which enables individual boxes to be traced and identified automatically and electronically.

The system may be configured to receive information from a barcode scanner and to interpret this information. When the system recognises the scanned barcode, it may automatically open a record (DMP template) relating to that particular box. This DMP template may be pre-populated with existing information about the box. The cataloguer is then able to amend or add to the DMP template. This is convenient, and ensures that there are no errors in the relationship between the barcodes and the box cataloguing information.

The following types of information are captured for the contents of each box:

Description of Contents,
Business Area/Department,
Document Type, and
Date Range.

Each document in the box may be catalogued by recording the data it contains, such as countries, company names, project names and staff names, as well as key words relating to the content of the documents.

The basic architecture of the archiving system is shown in FIG. 1. The system comprises an archiving controller 10 which controls access to archived collections of items, such as boxes of stored documents. The archiving controller 10 communicates with a box retrieval facility 12 and a box storage facility 14. The box retrieval facility 12 is operable, on instructions from the archiving controller 10, to control and facilitate the retrieval of an appropriate box from storage and delivery to a location specified by the archiving controller 10. The box storage facility 14 is operable, on instructions from the archiving controller 10, to arrange for the movement of a box of documents from a location specified by the archiving controller 10 to the storage location. The Porter role mentioned above performs the box retrieval and storage.

As discussed above, the documents are catalogued according to a Document Management Policy (DMP). A Document Management Policy template is created for each box. The DMP template for each box may be completed by a document user input device 16 or an archiving input device 18, which may compromise general purpose computers including a display unit 40 having a screen, an input unit 42 such as a keyboard/mouse and a processor 44. The user performs the Cataloguer role mentioned above. The document user input device 16 is used by the normal user of a document to complete a DMP template when a document is initially boxed when that document ceases to be a current document. The document user input device 16 is used by the normal user of the document, who was responsible for the document while the document is a current document. The document input device 16 displays the DMP template for the document box and the user completes the relevant fields using their knowledge of the content of the box. This process is described in greater detail below. The completed DMP template for the box is then uploaded from the document user input device 16 to the archiving controller 10, and from there is passed to the completed DMP template store 20 for storage of the completed DMP template. The archiving controller 10 then arranges, using the box storage facility 14, for the box to be moved to an appropriate storage location for boxes of non current documents.

If the organisation has boxes of archived documents that were archived before the document management system was implemented, these may be catalogued using archive input device 18. The archiving controller 10, using the box retrieval facility 12 retrieves un-catalogued boxes from storage and distributes them to the location of the archive input devices 18. Of course there may be a multiplicity of archive input devices 18 that are co-located or distributed over different locations. The archive input device 18 displays DMP template for each box of documents. The Intelligent Cataloguer then reviews the contents of the box and completes the DMP template for that box via the user interface of the archiving input device 18. This process if described in greater detail below. The completed DMP template is then uploaded to the archiving controller 10, from where it is passed to the completed DMP template store 20 for storage. The archiving controller 10 may then arrange, using the box storage facility 14, for the catalogued box to be put in appropriate storage location.

The characteristics of documents that are to be preserved are input to the archiving controller 10 by DPN controller device 22, which may comprise of general purpose computer. Details of a DPN will be provided by a Legal Super User, and a DPN may be amended or cancelled by a Legal Super User. The characteristics of the documents to be preserved may be input in any suitable form. For example, the characteristics may be entered as free text (normal sentences), which are parsed (or subject to syntactic analysis) and converted into key words. Alternatively, the key words may be input directly by the user. The key words may be linked to form Boolean strings. For example, if the key words are "cellular" and "Australia" and "roaming", applying any one of those key words as the sole search criterion for documents would result in a very large number of "hits". If a DPN is concerned with cellular roaming in Australia, then advantageously the key words are combined in a Boolean string:

"cellular" AND "Australia" AND "roaming".

If such a Boolean string is used to search for documents, only those documents that are relevant to all of those search terms are returned, meaning that only more relevant documents are identified.

The key words and Boolean strings for each DPN are received from the DPN control device 22 by the archiving controller 10 and are stored in the DPN search terms store 24. The archiving controller 10 controls when searches are performed in accordance with any or all of the DPN records in the DPN search terms store 24. When a DMP search is performed, any box identified as being relevant to a DPN has its DMP template marked appropriately (with a "hold" designation), so that that box is recognisable as being relevant to a particular DPN. The template stored in the DPN template store 20 is updated accordingly. This process is described in greater detail below.

The system further comprises a document destruction controller 26 that is coupled to the archive controller 10. The document destruction controller 26 is operable to obtain details of completed DMP templates for boxes stored in complete DMP templates store 20 via the archiving controller 10. The document destruction controller 26 is operable to select documents for destruction in accordance with information contained in the DMP template for each box. If the box is identified as being appropriate for destruction, the document destruction controller 26 arranges for retrieval of the box by sending a command via the archiving controller 10 to a box retrieval facility 12. The box is then retrieved and delivered to a secure document destruction facility.

The elements shown in FIG. 1 are connected to the archiving controller 10 for data communication therewith by any suitable mechanism—for example by a wireless or fixed connection that may be made via an intranet or the Internet.

The above description in relation to FIG. 1 is intended to provide a brief overview of the system architecture and functionality. Detailed aspects of operation of the system will be described below.

The purpose of the cataloguing being performed by the users of devices 16 and 18 is to record information about the contents of each box in a consistent manner, facilitated by the structure of the DMP template. The aim is to record, in a systematic format, sufficient information about each box to give a fair representation of its content. A proportion of boxes catalogued by Intelligent Cataloguers may be checked by DMP template quality control facility 28. For example, the quality control facility 28 may be operated by a quality controller to communicate with the archiving controller 10 to retrieve catalogued boxes from storage to perform a manual review of the content of the boxes to ensure that the DMP template for that box has been completed fully, accurately and appropriately. If the DMP template is found not to be completed correctly, the DMP template may be corrected, with the corrected DMP template stored in DMP template store 20. Further remedial action may be taken, such as training or retraining of the users of input devices 16 and 18 so that future DMP templates are completed correctly.

DPN quality control facility 30 may also be provided. When a DPN search is performed, a proportion of the boxes are identified as not relevant to the DPN. The DPN quality control facility 30 may retrieve the DMP templates (from DMP templates store 20) to conduct a computer screen and/or manual review the template to determine whether the boxes (or a selection of the boxes) may in fact be relevant to a DMP. Such a review acts as a check on the scope of the DPN search terms (key words and Boolean strings) so that they may be refined. For example, additional key words may be added to the search terms, and the Boolean strings modified, to change the boxes that are identified as being relevant to a particular DPN.

A Special Point of Contact (SPOC) review function 32 and box destruction function 34 are also provided, which will be described in more detail below.

The archiving controller 10 is also coupled to the HR (personnel) records 36 for the corporation.

Cataloguing of Archive Boxes (phase 1)

The procedure for cataloguing of archive boxes will now be described in more detail with reference to the flow chart of FIG. 2.

Figure 2A:
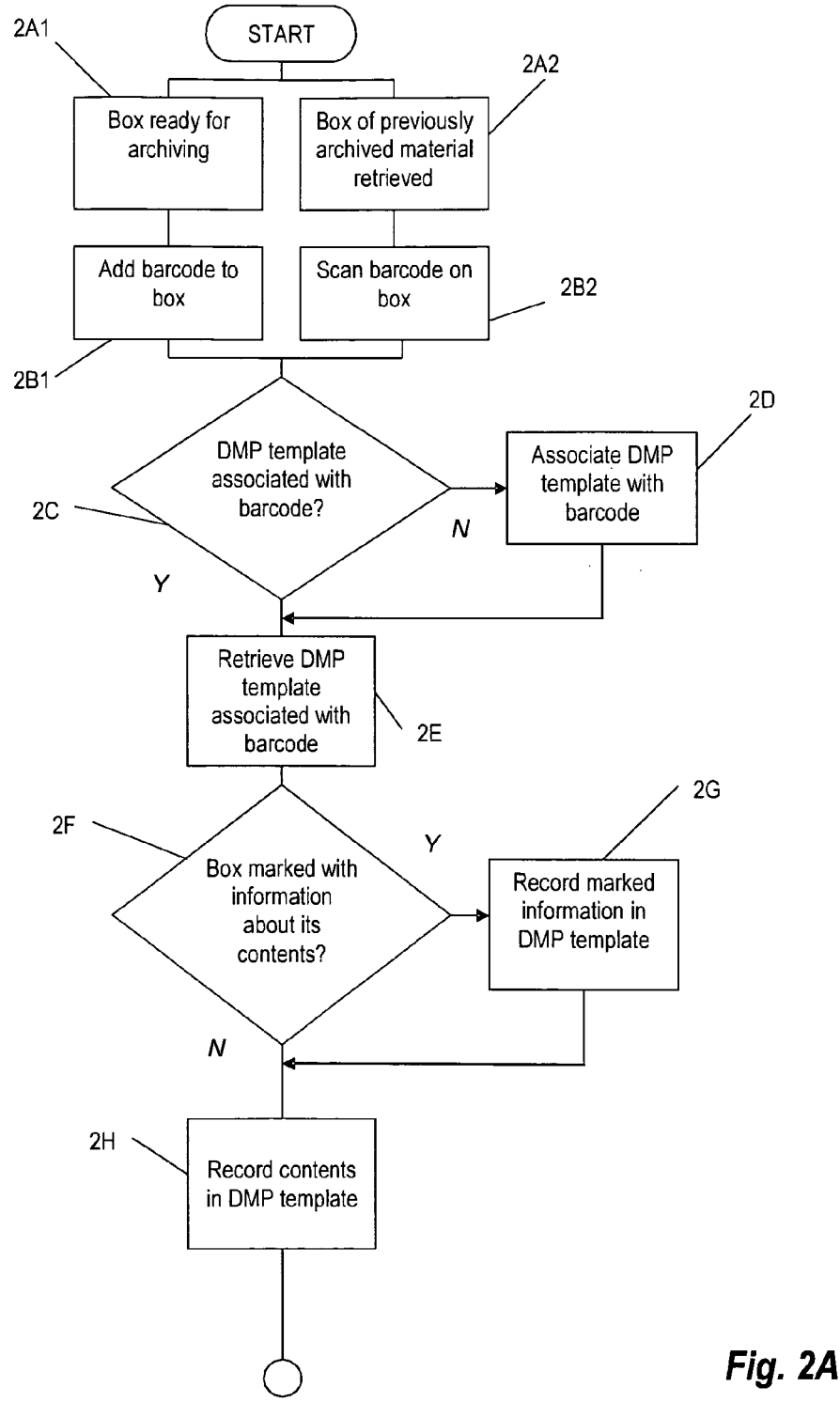
FIGS. 2A and 2B are a flowchart showing the process for the cataloguing of boxes of archived documents.
Figure 2B:
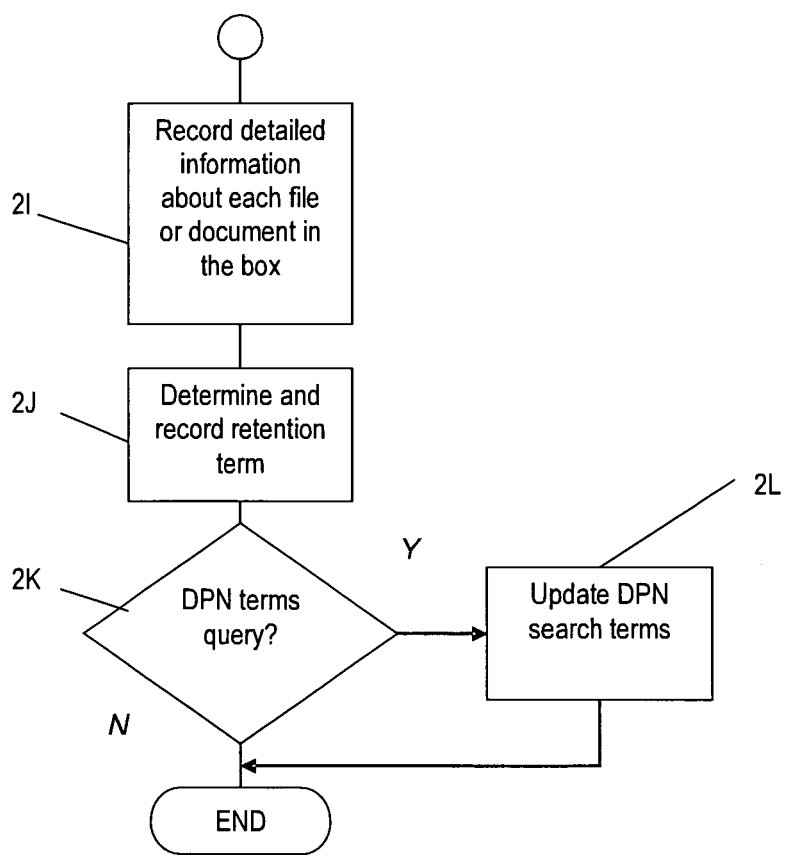

The initial steps of the flow chart shown in FIG. 2 depend upon whether the box to be catalogued has been previously archived or whether it is scheduled for initial archiving, following it becoming non-current. The latter scenario will be considered first.

At step 2A1 a box of documents ceases to become current and is ready for archiving.

At step 2B1 a unique barcode is added to the box so that the box may subsequently be readily identified by using a barcode scanner that is linked to a database of barcodes and associated box IDs.

If a box has been previously archived, as an alternative to steps 2A1 and 2B1 above, steps 2A2 and 2B2 are performed as follows.

At step 2A2 a box of previously archived material is retrieved from a store. For example, this may be performed by an instruction from the archiver input device 18 to the archiving controller 10, which then issues an appropriate box retrieval command to the box retrieval facility 12, resulting delivery of the box to the archiver operating the archiver input device 18. At step 2B2, the barcode on the retrieved box is scanned, for example, using a barcode scanner coupled to the archive input device 18.

Following step 2B1 or 2B2, step 2C is performed, at which it is determined whether a DMP template is associated with the barcode. This may be performed by reading the barcode (at document user input device 16 or archiver input device 18), and transmitting the barcode to the archiving controller 10, at which a determination is made of whether a DMP template is associated with the barcode. For example, the completed DMP template store 20 may be consulted to determine whether this is a completed DMP template for that barcode. If at step 2C it is determined that there is no DMP template associated with the barcode, then, at step 2D a DMP template is associated with the barcode. The template has the predetermined structure mentioned above but will include no data other than barcode information. This is typically performed by the archiving controller 10.

At step 2E the DMP template associated with the barcode is retrieved. The DMP template may be transmitted by the archiving controller 10 to the device 16 or 18 (as appropriate).

The DMP template triggers the display of a form on the user interface (an inputting screen) on device 16 or 18, which shows fields that require completion. An example of a first page of this form is shown in FIG. 7A.

The inputting screen includes a first field, "1. Cataloguer's Identity". This field will be pre-populated as their identity will be know from when the logged into the system and were authenticated (the archiving controller stores a list of catalogue IDs and passwords and controls the logging-on of users to the system).

The inputting screen includes a second field, "2. Barcode". This field is populated by the barcode read from the box by using a hand held scanner, avoiding any human error.

The inputting screen includes a third field, "3. Box Details". At step 2F it is determined whether the box is marked with information about its contents. If at step 2F it is determined that the box is marked with information about its contents, at step 2G this marked information is stored in the DMP template for that box. There is a free text box to complete, or an option to select 'none' if the box is not marked with information about its contents. The user inputs the information using the input unit 42 (such as a keyboard and/or mouse). The input information is automatically displayed on the user interface of the device 16 or 18 in the appropriate position within the on-screen template. The information may be stored temporarily in the device 16 or 18 until a particular time, such as when the DMP template is completed, or the information may be transmitted to the DMP template store 20, via the archiving controller 10, as it is entered by the user.

The inputting screen includes a fourth field, "4. Box content description". Details of the box contents are entered in step 2H. If the box has a contents list then the information in the contents list may be used to help complete the DMP template. If there is no contents list (or if it is insufficient), then the cataloguer reviews the contents of the box. A drop down list provides options, including Lever arch files (if selected the cataloguer will be asked to input the number of files)
Envelopes (if selected the cataloguer will be asked to input the number of envelopes)
Cardboard files (if selected the cataloguer will be asked to input the number of files)
Hard backed A4 notebooks (if selected the cataloguer will be asked to input the number of notebooks)
Loose papers
Other (if selected a free text box will be offered to detail)
Various (then offer the above types to select from)

The user inputs the information using the input unit 42 of the device 16 or 18. The input information is automatically displayed on the user interface of the device 16 or 18 in the appropriate position within the on-screen template. The information may be stored temporarily in the device 16 or 18 until a particular time, such as when the DMP template is completed, or the information may be transmitted to the DMP template store 20, via the archiving controller 10, as it is entered by the user.

Once this page has been completed, the cataloguer will move to the next inputting screen for the form, an example of which is shown in FIG. 7B.

At step 2I detailed information about each item (file or document) is added to the DMP template for the box. The cataloguer is offered three buttons to select in this non-limiting embodiment from—'document', 'file' and 'other'. Each button will offer the following drop down options:

Date range
Country
Names
Subject line on memo/document
Company names
Document types
Business area
Address/location
Possible file owner/custodian
File title/name The cataloguer will be able to complete these fields as many times as they wish, with any combination of options, until all files or documents in the box have been catalogued. The user inputs the information for each of these fields using the input unit 42 of the device 16 or 18. The input information is automatically displayed on the user interface of the device 16 or 18 in the appropriate position within the on-screen template. The information may be stored temporarily in the device 16 or 18 until a particular time, such as when the DMP template is completed, or the information may be transmitted to the DMP template store 20, via the archiving controller 10, as it is entered by the user.

The cataloguer is an intelligent person who has been trained to complete the DMP template in a methodical and consistent manner. Although the cataloguer will have received training on each of the DPNs in existence, the cataloguer is not directly involved in the (generally legal) matter to which the DPN relates. The cataloguer is therefore able to catalogue the documents objectively, and will not be influenced by the background to the DPNs.

The cataloguing process is not intended to require for each document to be read and studied in its entirety. Indeed a detailed analysis of each document is not generally necessary. Often the heading or title of a document will provide sufficient information to complete the DMP template without significant (or any) further investigation.

Although the DMP template for a box is intended to indicate the contents of all the documents (and other items) in the box, the DMP template is intended to allow a box to be identified as relevant to a DPN. Identifying the relevant document (or other item) in the box will be done manually by a lawyer, paralegal or the like after the box is retrieved. Therefore, when completing the fields for a box, it is only necessary to record each name, county, subject line, company name, business area, address/location and file owner/custodian once for each box. If the same information item occurs more than once in the same box, only the first occurrence needs to be recorded. A "duplicate" option for selection in the form is provided, The fields should be populated as follows:
Date Range
There may be a specified date range on a file or document title or one that can be obtained by flicking through documents. The oldest and newest dates of document are recorded in the DMP template in the relevant field.

Country (Defaults to UK if Left Blank)
It is determined if there any reference to a country other than UK. This may be in file titles, subject line of memo, contained within main body of text. The relevant country or countries are entered in the DMP template in the relevant field. A drop down list of countries may be provided for selection by the cataloguer.

Names

Names may be written on the box, on files or notebooks. Names will be used on memos, both the author and recipient. Any names may be company employees or external. The names are recoded in the DMP template in the relevant field.

Subject Line on Memo/Document

Where a box contains loose papers, the subject line should be captured of approximately every $10^{th}$ memo/document. Where a file contains a large volume of papers within it, it may be useful to capture some subject lines. The subject information is recorded in the DMP template in the relevant field.

Company Names

Company names may be found in box descriptions, file titles, subject line or within the body of text. The company names are recorded in the DMP template in the relevant field.

Document Types

Documents may be categorised according to a particular business area. Such business areas may include:

Legal: incorporation documents, licence agreements, share purchase agreements, roaming agreements, intellectual property certificates and licences, and Board minutes.

Regulatory: regulations and guidance notes, and regulator's notices and meeting notes.

Marketing: advertising, sponsorship agreement, and product specifications.

Business development: data such as the number of subscribers, average use etc.

Corporative affairs: press releases and the like.

Research and development: research and development reports and non-published articles.

Technology: staff web logs, staff email usage logs, staff investigation files, and staff PC usage.

Networks: details of network usage such as unsuccessful calls log, SMS usage data, alarms raised by switches etcetera.

Finance: budgets, balance sheets, payment receipts, payroll records etcetera.

Tax: corporation tax records, PAYE records, VAT records, etc.

Fraud risk and security: evidence and reports.

Supply chain management: contracts with supplier, rental and hire purchase agreements, etc.

Human Resources: employee and contractor contracts, disabled employee records, etc.

Health and Safety: accident book.

Retail: customer contract, customer call details, customer complaints, credit card transactions, etc.

Property: title deeds, leasehold agreements, etc.

Internal Documents: company policies, meeting minutes, letters etcetera.

Business Area

The business area may be identified from box details, file titles or document content. The business area or business areas to which the documents in the box relate are recorded in the DMP template. Conveniently, the DMP template is provided with a drop down list of possible business areas from which the user can select one or more entries for recording the DMP template.

Business areas may include: Finance; Supply chain management; Legal; Human resources; Consumer; Enterprise; Marketing; Retail; Property Address/Location Addresses may be found on a file's title, subject line of memo/correspondence or within main body of text. The addresses/locations are recorded in the DMP template in the relevant field.

File Owner/Custodian—SPOC

This may be identified from file title, box information, or names on documents. The box owner, if this is clear from the names of individuals offering or receiving documents within the box, is recorded in the DMP template. A Specific Point Of Contact (SPOC) within a department is allocated to the box.

When a box is marked for destruction, the SPOC is notified. Advantageously, the document management system communicates with the corporate HR system 36 to trace the SPOC should they change position within the corporation. If the SPOC cannot be traced, then the HR system 36 is used to identify their line manager, and the line manager is notified that the box is marked for destruction.

File Title/Name

Each file or document is reviewed to see whether it has a title. If the title does accurately and sufficiently describe the contents of the file, then this is recorded in the DMP template. If, on the other hand, there is no title for the file, or if the title does not accurately and sufficiently describe the file contents, the file is reviewed and an appropriate title is then recorded in the DMP template.

At the end of the data capture process for the box, a check is automatically made of whether all the DMP template fields have been completed. If any fields are not completed, the cataloguer is alerted to this via the user interface of the device 16 or 18. The cataloguer must then confirm that there is no information for the incomplete fields, or may complete those fields. A "duplicate" indication is considered as adequate completion of a template field if that field includes a full entry for another item in the box. Some fields must always be completed (e.g. "date range", "document type", "SPOC" and "business area"), and the cataloguer must populate these fields before the cataloguing of the box is completed.

The cataloguer may also enter free text for any box if the box is considered to include important information that is not relevant to any of the fields. The free text is searchable.

At step 2J the retention period for the box is determined.

Retention periods for particular categories of documents may be set, based on local law statutory requirements. For example, corporation tax documents, VAT documents and PAYE documents should be retained for at least six years. Deeds of covenant should be retained for at least thirteen years. Documents relating to maternity and sick pay should be retained for at least three years. There may, however, be business considerations which make it preferable to retain such documents for longer. Of course, for many documents there is no legal period for their retention, such as documents relating to unsuccessful job applications or employee expense accounts. However, it is advantageous that a consistent policy is applied to such documents, although implementing such a policy consistently is impossible or extremely difficult using known systems.

Advantageously, a retention period (e.g. in years) is set for each of the "document types" mentioned above. A database of retention periods for each type of document is maintained by the archiving controller 10.

The retention period for a box may be calculated manually by the user of the device 16 or 18, or may be performed in dependence upon the information input in step 2I. For example, the predetermined retention periods for each of the "document types" recorded in step 2I may be determined, and the most recent document of each of those types is determined. The date on which the retention period of the most recent document of each type ends is then calculated The latest of those dates is the retention period of the box. This is added to the template.

For example, a box may include the following "document types":

VAT documents—retention period 6 years
Deeds of covenant—retention period 13 years The most recent (newest) document of each type may be as follows:

VAT document—1 Jun. 2005
Deed of covenant—1 Jan. 1999

The retention periods of the most recent (newest) document of each type are calculated as follows:

VAT document—1 Jun. 2005+6 years=1 Jun. 2011
Deed of covenant—1 Jan. 1999+13 years=1 Jan. 2012

The latest of these dates is the retention period for the box, i.e. 1 Jan. 2012 in this example.

At step 2K the user of the device 16 or 18 may be given the opportunity to query the DPN terms (key words and Boolean strings) for any particular DPN. For example, the user of device 16 or 18 may be given as part of their training background information regarding each DPN and a list of the key words and Boolean strings used to identify documents relevant to that DPN. If their review of the documents in the box indicates to the user of device 16 or 18 there may be terms not included in the DPN terms that would be relevant to identify the documents relevant to that DPN, these may be passed to the DPN control device 22 via the archiving controller 10 at step 2L. The DPN control device 22 can then determine whether to update the DPN terms, typically by interacting with a LSU via the user interface. For this purpose the user interface of the device 16 or 18 may include a DPN query button. Activating this button automatically passes relevant information to the DPN control device—such as the identity of the relevant DPN and the identity of the relevant box (e.g. its barcode).

The cataloguing of archive boxes will also include a procedure for performing quality control by quality control facility 28, in which a second operator reviews some (e.g. 10%) or all of the boxes catalogued and the DMP template completed for each of those boxes to determine whether the DMP templates have been correctly.

Document Preservation Notice (DPN Searches (phase 2)

Figure 3:
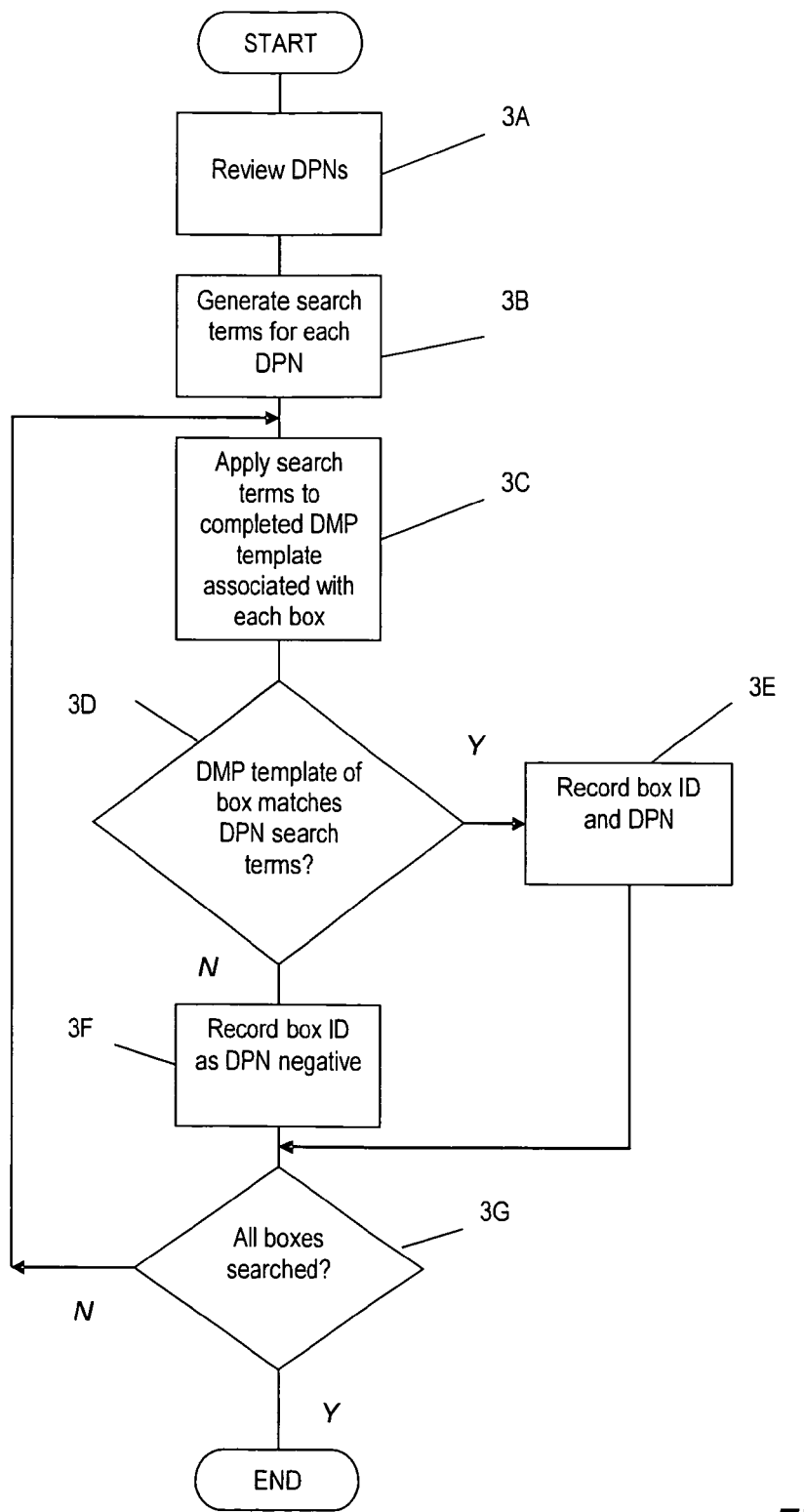
FIG. 3 is a flowchart showing the procedure for searching for documents relevant to a document preservation notice.

The procedure for searching for documents relevant to a DPN will now described in reference to the flow chart of FIG. 3.

As an initial step, if DPN search terms (key words and Boolean strings) have not been determined for a DPN, at step 3A, the DPN is reviewed the appropriate key words and Boolean strings may be devised by DPN control device 22 in the manner described above. The generated search terms for each DPN are then stored in the DPN search terms store 24 at step 3B.

As mentioned above, if a DPN is concerned with cellular roaming in Australia, then advantageously the key words may combined in a Boolean string:

"cellular" AND "Australia" AND "roaming".

Applying this Boolean string to the completed DMP templates in store 20 will identify boxes that include all of the keywords "cellular", "Australia" and "roaming"—in whichever fields those words appear. The DPN search terms can be more specific by requiring a particular keyword to be present in a particular field.

With the example of a DPN concerning cellular roaming in Australia, the Boolean string may be:

(Subject line on memo/document="cellular" OR File title/name="cellular" OR Free text="cellular")
AND
(Country="Australia" OR Address/location="Australia")
AND
(Subject line on memo/document="roaming" OR File title/name="roaming" OR Free text="roaming")

The capitalised "AND" and "OR" expressions are Boolean operators. Other Boolean operators may also be used.

This DPN searches for keywords only in specific fields.

The archiving controller 10 is now ready to perform a search for boxes relevant to one or more DPNs. At step 3C the search terms relevant to one or more DPNs from the DPN search term store 24 are applied by the archiving controller 10 to each template present in the completed DMP template store 20.

At step 3D it is determined whether the DMP template of each box matches the search terms of one or more DPN. If a match is found to exist at step 3D then, at step 3E the identity of the box and the relevant DPN is recorded. The identity may, for example, correspond to its barcode. The DMP template for the box is marked with a "hold" designation. A single box may be relevant to a plurality of DPNs, in which case the box is marked as being relevant to each of the DPNs.

When a box is subject to a DPN, automatic destruction of the box at the expiry of the retention term will be suspended. A box with a "hold" designation is preserved until the DPN is removed (or until all the DPNs are removed if multiple DPNs have been applied). When a box is subject to a DPN, the "SPOC" in the DMP template is modified to a LSU who is responsible for the DPN applied to the box.

On the other hand, if at step 3D, it is determined that a box does not correspond to the search terms of any DPN, then at step 3F that box is recorded as "DPN negative" indicating on the DMP template for the box that the box is not relevant to any DPN. Automatic destruction of the box may then be performed at expiry of the retention term.

At step 3G it is determined whether the DPN templates of all the boxes have been searched. If the DMP templates for the boxes have not been searched, then the process returns to step 3C, otherwise the process ends.

The procedure of FIG. 3 may be repeated at regular intervals, or may be triggered in response to a particular event, such as the addition of a new DPN by the DPN control device 22, the changing of a DPN search term, or introduction of one or more new boxes to the archive.

With regard to steps 3D and 3F, in an embodiment a box may only be recorded as "DPN negative" when the search terms have all the current DPNs are applied in the procedure of FIG. 3 so that a box is only marked as "DPN negative" if it is not relevant to all of the DPNs.

Sometimes it will be desired to remove a DPN from a particular file, or from all files. This may happen, for example, when litigation is ended. This will be performed by a LSU accessing the DPN control device 22. The DPN control device 22 then removes the relevant DPN search terms from the DPN search terms database 24 (via the archiving controller 10). The DMP templates of the boxes to which the DPN was applied are then updated in the DMP template store 20 to remove the "hold" designation for that DPN (a "hold" designation from other DPNs may remain). When a DPN is removed, the "SPOC" field of the DMP template of the relevant boxes if updated to revert to the original SPOC before this was amended to be the LSU responsible for the DPN.

On removal of (all) the DPNs the retention term for the box is reviewed. If the retention term has expired, the box may be marked for destruction.

A LSU is able to apply a Universal Hold Order (UHO) to all archived boxes. This will suspend all destruction of files. Typically a UHO will be issued when a new litigation begins and time is required to devise suitable DPNs and to apply them to the catalogued documents.

DPN Search Quality Control Review (phase 3)

Figure 4:
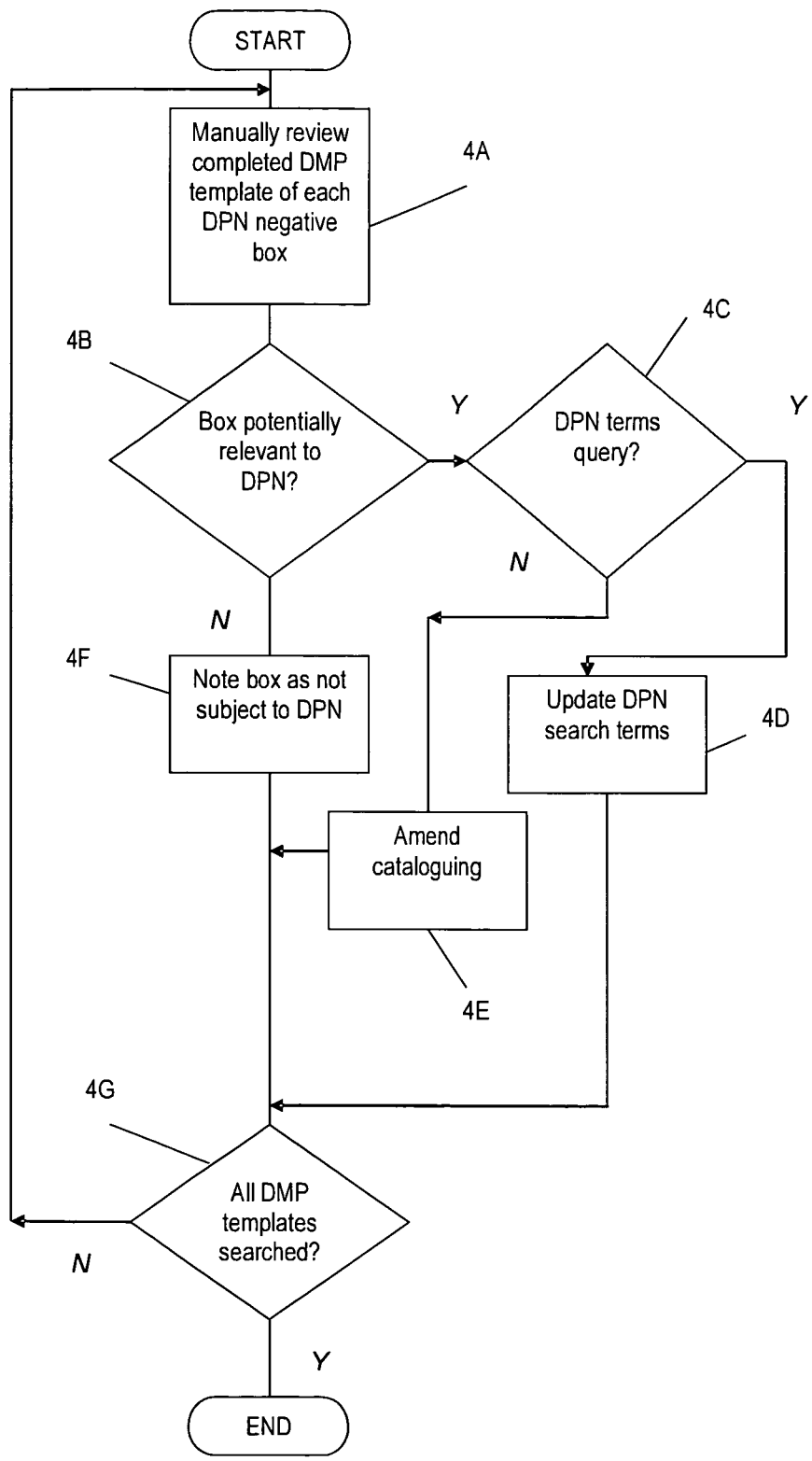
FIG. 4 is a flowchart showing the procedure for performing a quality control view of the document preservation notice search.

The flowchart of FIG. 4 describes the process by which the DPN search(es) performed by the process described in relation to FIG. 3 is reviewed. The primary objective of the process of the flowchart of FIG. 4 is to perform a review of the DMP templates of any boxes considered to be "DPN negative" in step 3F. Such review is performed by the DPN quality control function 30, and is advantageously performed by displaying on the graphical user interface of a general purpose computer the DMP template information for all of or a representative selection of the boxes recorded as "DPN negative" in step 3F.

At step 4A the DMP template for a box recorded as "DPN negative" in step 3F is retrieved from the completed DMP template store 20 by the archiving controller 10 and is transmitted to the DPN quality control function 30 for displaying the graphical user interface of a general purpose computer associated with that function.

At step 4B a user (for example a Legal Super User) reviews the DMP template. The user has knowledge of the relevant DPN or DPNs. The user determines, notwithstanding the outcome of the DPN search performed in the procedure of the flow chart of FIG. 3, whether the box categorised as "DPN negative" may in fact be potentially relevant to a DPN, thereby acting as a check against inadvertent mis-classification of a box. If at step 4B a box is determined to be potentially relevant to a DPN then, at step 4C the user determines whether the search terms for a DPN should be amended.

If at step 4C it is determined that the DPN search terms should be amended, the DPN search terms are updated at step 4D. The request to amend the DPN search terms is transmitted via the DPN quality control function 30 of the archiving controller 10. The DPN search term store 24 is then updated. Future searches using the DPN search terms will then use the modified DPN search terms. Modification of the search terms may automatically trigger performance of a DPN search according to the flow chart of FIG. 3.

If at step 4C it is determined that the DPN terms are sufficient, then, at step 4E the cataloguing procedure process of the flow chart of FIG. 2 may be amended. For example, the cataloguers may be given updated training, or the DMP templates may be modified in order to capture further detailed, or more relevant information.

On the other hand, if at step 4B it is determined that the box is not relevant to a DPN, then at step 4F it is noted at the box is indeed correctly not subject to a DPN. The DMP template (from store 20) for that box may be marked accordingly.

At step 4G it is determined whether all the required DMP templates have been checked. It should be noted that not necessarily all the DMP templates of DPN negative boxes will be checked, but only a representative sample. If all the required DMP templates have not been checked, then the procedure returns to step 4A; otherwise, the procedure ends.

Pre Disposal SPOC Review (phase 4)

Figure 5:
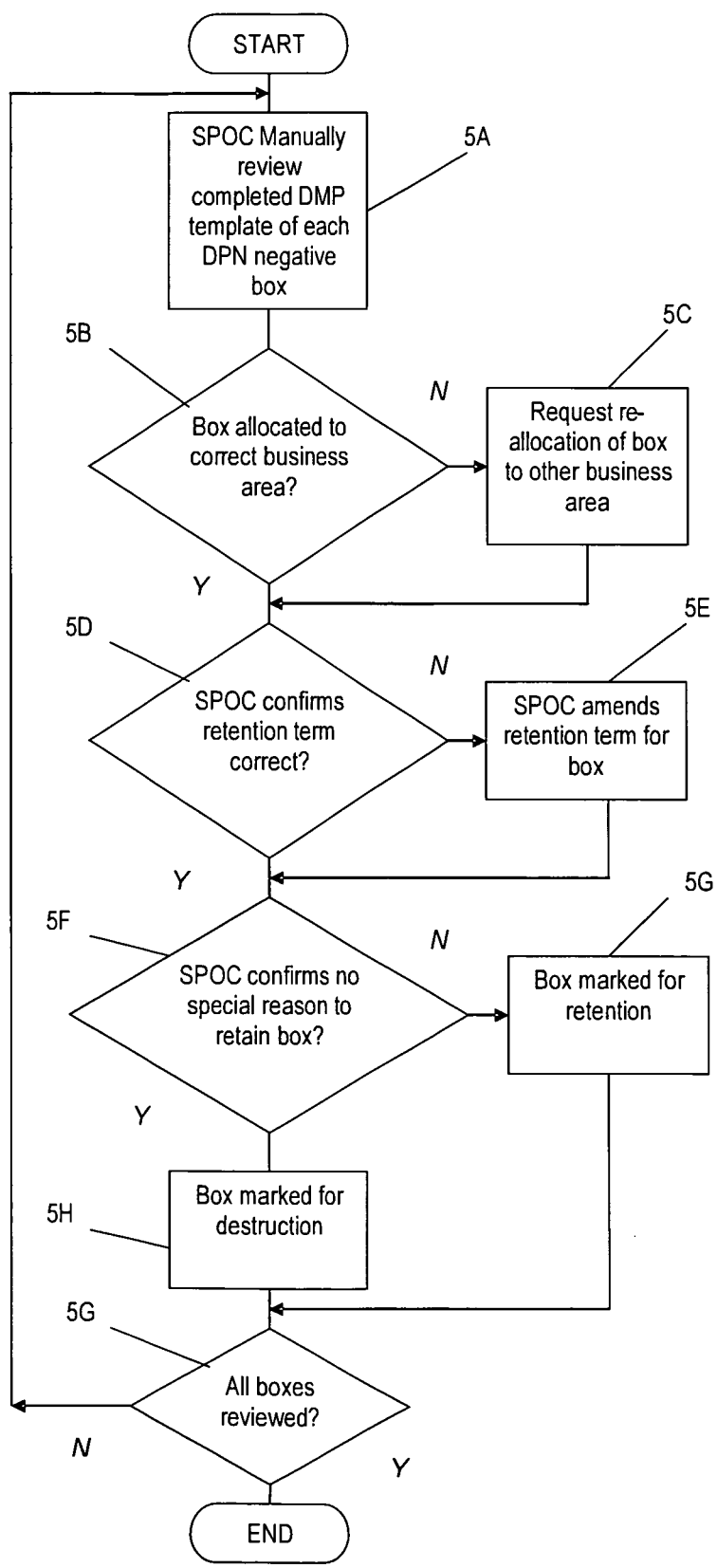
FIG. 5 is a flowchart showing the procedure for performing a specific point of contact review of the cataloguing of archived documents.

The purpose of the process to be described with reference to the flow chart of FIG. 5 is to confirm the retention terms for boxes that are determined not to be subject to a DPN, i.e. "DPN negative" boxes, and to confirm that there is no other business reason to retain the box contents.

The Special Point of Contact (SPOC) is a person in the business area or each business area to which a box is considered to relate, as recorded in, step 2I of the flow chart of FIG. 2.

At step 5A the SPOC, using the SPOC review function 32, manually reviews the completed DMP template for each "DMP negative" box.

At step 5B the SPOC determines whether the box is allocated to the correct business area. For example, the SPOC may determine whether they are the relevant person to review the box or whether another SPOC would be more appropriate.

If at step 5B it is determined that the box should be allocated to a different business area then, at step 5C, the box is reallocated to the appropriate business area, and the DMP template for the box is updated by the archiving controller 10 sending an appropriate update request the DMP template store 20.

At step 5D the SPOC of the appropriate business area determines whether the retention term of the box calculated at step 2J should be extended for business purposes. If it is determined at step 5D that the retention term of the box should be extended, at step 5E, the SPOC amends the retention term of the box. The archive controller 10 may then update the appropriate part of the DMP template for that box in the DMP template store 20.

At step 5F the SPOC determines whether there is any special reason to retain the box.

If at step 5F it is determined that there is a special reason to keep the box then, at step 5G the box is marked for retention. The archiving controller 10 may make an appropriate modification to the DMP template in DMP template store 20.

On the other hand, if at step 5F, it is determined that there is no special reason to retain the box then, at step 5H the box is marked for destruction, and the archiving controller 10 makes an appropriate amendment to the DMP template for that box in the DMP template store 20. Destruction does not occur until the retention term expires, as discussed below.

At step 5G it is determined whether all the required boxes have been reviewed by the SPOC. If all the required boxes have not been reviewed by the SPOC, then the procedure returns to step 5A; otherwise the procedure ends.

Retention/Disposal (phase 5)

Figure 6A:
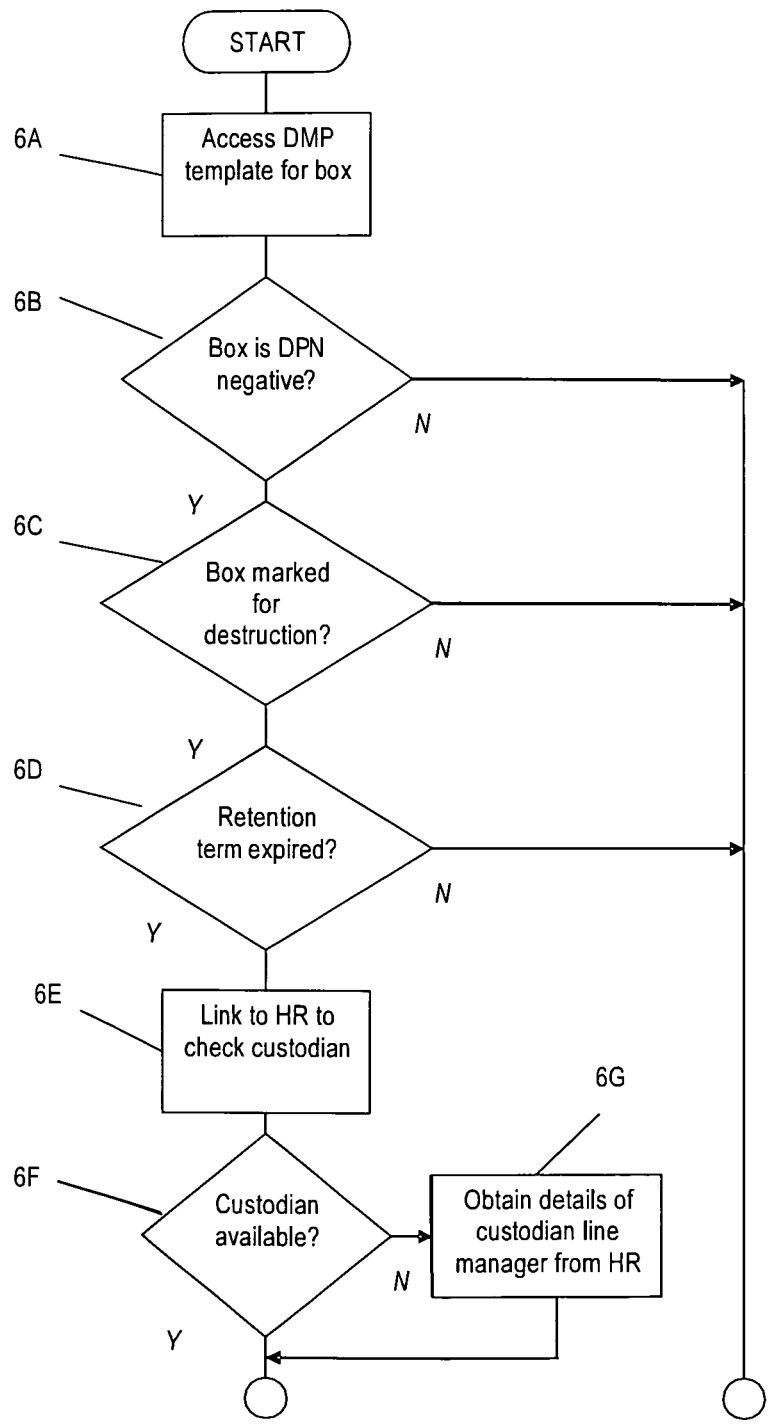
FIGS. 6A and 6B are a flowchart showing a procedure for performing a destruction decision.
Figure 6B:
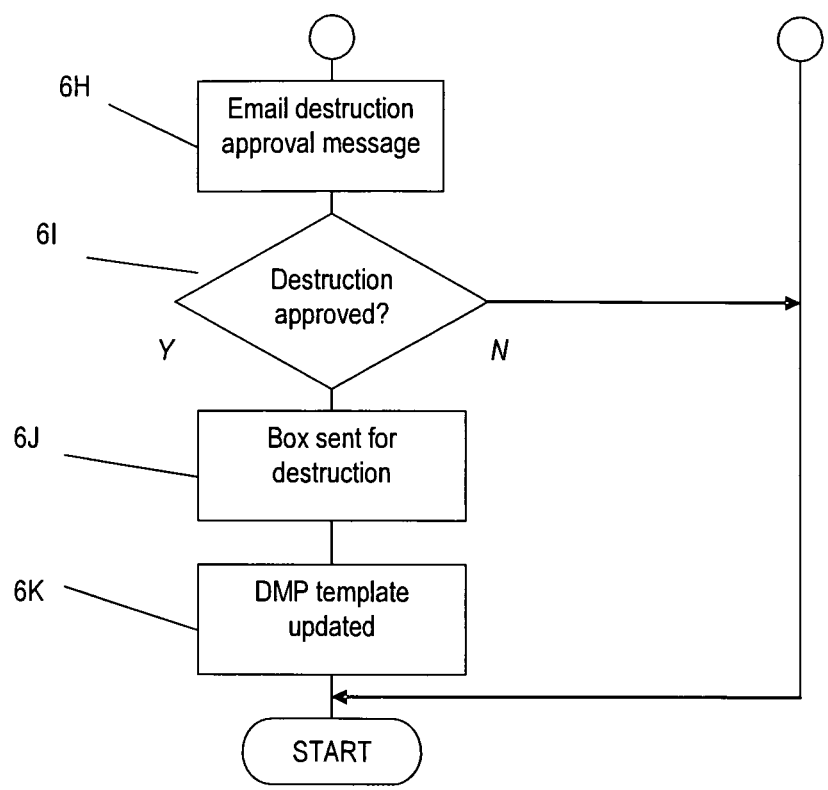

The procedure for determining whether to retain or dispose of documents will now be described with reference to the flowchart of FIGS. 6A and 6B.

At step 6A the DMP template for a box of archived documents is accessed by the destruction function 34 accessing the completed DMP template store 20 via the archiving controller 10. Details of the DMP template for that box are then retrieved and reviewed.

At step 6B the DMP template is reviewed to determine whether the box is marked as "DPN negative". If the box is not marked as "DPN negative", the procedure ends.

On the other hand, if the box is marked as DPN negative then at step 6C the DMP template of the box is reviewed to determine whether the box is marked for destruction. If the box is not marked for destruction, then the procedure ends.

On the other hand, if the box is marked for destruction, then at step 6D the retention term of the box is reviewed and compared to the current date. It is determined whether the retention term of the box has expired (i.e. where the current date is later than the retention term for the box). If the retention term has not expired, then the procedure ends.

On the other hand, if the retention term has expired, then at step 6E details of the SPOC recorded for the box are obtained from the DMP template. The destruction function 34 then consults the HR records 36 to obtain information about the SPOC by communicating via the archiving controller 10.

At step 6F it is determined from the HR records 36 whether the SPOC is available. For example, it is determined whether the SPOC is still employed by the corporation.

If at step 6F it is determined that the SPOC is not available, then at step 6G details of the SPOC's line manager are obtained from the FIR records 36.

At step 6H an email is automatically generated to notify the SPOC, or their line manager as appropriate of the boxes scheduled for destruction. That email may include details of the DMP template for the box or a link to that DMP template that allows the content of the template to be retrieved from the store 20. This allows the custodian (or line manager) to review details of the box to ensure that they are aware of the content that is to be destroyed.

At step 6I the SPOC (or line manager) decides whether to approve the destruction of the box. If destruction of the box is not approved, then the procedure ends. However, the DMP template for the box is advantageously modified to include a new retention term—for example, that expires six months from the current date. This allows the requirement for destruction of the box to be reviewed periodically, so that the box can be destroyed when appropriate, after approval by the SPOC (or line manager).

If, on the other hand, destruction of the box is approved, then at step 6J the box is sent for destruction. Depending on the location of the box, a communication may be sent to the box retrieval function 12 to retrieve the box and move it to a secure destruction facility.

At step 6K the DMP template for the box is updated to indicate that it has been destroyed. Various data regarding the destruction of the box are recorded, such as the date of destruction. Advantageously, an "audit trail" of the checks made prior to destruction of the box is recorded in the DMP template. This might include details of the DPNs in force at the time and the checks made by a SPOC prior to destruction of the box. Advantageously, this audit trail can be used to demonstrate the date of and reasons for, destruction of a box. This may be useful subsequently if it transpires that the box would be relevant to litigation that is initiated after destruction of the box. The audit trail would provide evidence that the box was destroyed in good faith such as to satisfy a Court the box was not deliberately destroyed to avoid disclosure in discovery of possibly damaging information.

The embodiment described has various advantages. The DPN search terms may be checked for effectiveness by applying them to selected boxes that are already known to be relevant to the matter to which the DPN applies. When the DPN search terms are applied to such boxes, if all the boxes are not identified as being relevant to the DPN, this indicates that the DPN search terms are inadequate. The DPN search terms should then be revised. The effectiveness of the DPN search terms can then be tested again against the same boxes. The process can be iterated under the DPN search terms do identify all the boxes known to be relevant to the matter to which the DPN applies.

Advantageously, should the retention policy for particular types of documents be changed, this can be applied automatically by the system. For example, if the law changes and it became necessary to retain a particular category of documents for a longer period, the DMP templates in the store 20 are reviewed to determine whether the box includes a document in that category. For each document in that category, the retention period for that document is re-calculated to reflect the new retention period. The retention term for the box is then re-calculated. Box containing documents for which the retention term has not expired will not be destroyed, thereby preserving the document for the appropriate time automatically.

The document management system advantageously will reduce the movement of boxes in and out of the archive store. Once catalogued, the boxes can be searched for relevance to a DPN electronically based on the DMP template for the box Retrieval of the box is not necessary to perform the DPN searching. This saves time and resources.

The function performed by the flow diagrams may be implemented using one or more conventional general purpose digital computers programmed according to the teachings of the present specification. Appropriate software coding can readily be prepared by skilled programmers based on the teachings of the present specification. Although in FIG. 1 separate elements are shown, the functions any number of these elements (or all of them) may be performed by a single computer. When a plurality of computers (or other processing devices) are used to implement the functions, the computers may communicate with each other using any suitable data bearer, communication protocol and transmission medium.

The system described herein thus may also include a computer product which may be a storage medium including instructions which can be used to program a computer to perform a process in accordance with the system described herein. The storage medium can include, but is not limited to, any type of disk including floppy disk, optical disk, CD-ROM, magneto-optical disks, ROMS, RAMs, EPROMS, EEPROMS, Flash memory, magnetic or optical cards, other portable storage media or drive with, for example, a universal serial bus (USB) interface, and/or any other appropriate tangible storage medium or computer memory on which executable code and/or electronic instructions may be stored and executed by a processor.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An archiving system for enabling searching for collections of items, the system comprising:
a data store having a plurality of storage areas, each of which relates to a respective collection of items and includes a plurality of pre-determined data fields, each for storing a particular type of information;
an input device having a display unit, an input unit and a processing unit, said display unit being configured to display, in the form of an image on a screen of said display unit, an archived items collection management template having a template field corresponding to each of said pre-determined data fields;
an archiving controller configured to control the transfer of data between said input device and said data store; and
a document search controller configured to search content of said data store in accordance with search criteria,
wherein said processing unit is configured to cause said display unit to display said archived items collection management template in respect of a particular one of said collections of items and to prompt a user to complete said template fields with data obtained by the user from manually reviewing that collection of items to capture information relevant to each of said template fields, said input unit being configured to receive the data obtained by the user, wherein said archiving controller is configured to store, in the pre-determined data fields of a one of said storage areas of said data store corresponding to said collection of items, the data from said completed template fields, and wherein said document search controller is configured to search the pre-determined data fields of said storage areas of said data store corresponding to each of said collection of items to identify at least one of said collection of items which matches the search criteria, wherein the plurality of pre-determined data fields include:

a data field for each respective collection of items that relates to the age of at least one item in the respective collection of items, and an item category field for each respective collection of items that relates to a category of the at least one item in the respective collection of items, wherein the search criteria include legal proceeding search terms that relate to legal proceedings, and wherein the archiving system further comprises:

a calculation device that automatically calculates a disposal time for each respective collection of items based on the age of the at least one item in the respective collection of items and the category of the at least one item in the respective collection of items, and a preservation device that is configured to record, in a particular predetermined data field in the storage area which relates to a particular collection of items details of the legal proceeding search terms in use at a date of destruction, being determined using the disposal time, of the particular collection of items, and that determines whether the particular collection of items is relevant to the legal proceedings using the legal proceeding search terms, and preserves the particular collection of items when the particular collection of items is determined to be relevant to the legal proceedings.

2. The archiving system of claim 1, wherein the search criteria include keywords or a Boolean string comprising one or more Boolean operators and a plurality of keywords.

3. The archiving system of claim 2, wherein the document search controller is configured to automatically derive the keywords or the Boolean string from search information provided by a user.

4. The archiving system of claim 1, wherein the search criteria include at least one criterion related to at least one of said pre-determined data fields, and wherein said document search controller is configured to search only the pre-determined data fields of said storage areas of said data store to which the at least one criterion relates.

5. The archiving system of claim 1, further comprising:

a database of recommended retention periods for each category of item, wherein the calculation device automatically calculates the disposal time based further on the recommended retention period of items in each respective collection of items.

6. The archiving system of claim 5, wherein the pre-determined data fields include a responsible person field for each collection that relates to a person responsible of at least one item in the collection, and wherein the archiving system includes a notification device that automatically notifies the person responsible when destruction of the collection becomes appropriate based on the calculated disposal time for the collection.

7. An archiving method for enabling searching for collections of items, comprising:

interacting with an archiving system, the archive system including:

a data store having a plurality of storage areas, each of which relates to a respective collection of items and includes a plurality of pre-determined data fields, each for storing a particular type of information;

an input device has a display unit, an input unit and a processing unit, said display unit configured to display, in the form of an image on a screen of said display unit, an archived items collection management template having a template field corresponding to each of said pre-determined data fields;

an archiving controller is configured to control the transfer of data between said input device and said data store; and a document search controller is configured to search content of said data store in accordance with search criteria;

the interacting including:

causing, using said processor unit, said display unit to display said archived items collection management template in respect of a particular one of said collections of items and to prompt a user to complete said template fields with data obtained by the user from manually reviewing that collection of items to capture information relevant to each of said template fields, said input unit receiving the data obtained by the user; and using said archive controller to store, in the pre-determined data fields of a one of said storage areas of said data store corresponding to said collection of items, the data from said completed template fields;

searching, using the document search controller, the pre-determined data fields of said storage areas of said data store corresponding to each of said collection of items to identify at least one of said collection of items which matches the search criteria, wherein the plurality of pre-determined data fields include:

a data field for each respective collection of items that relates to the age of at least one item in the respective collection of items, wherein the search criteria include legal proceeding search terms that relate to legal proceedings, and wherein the archiving method further comprises:

generating a category field for each collection that relates to the category of at least one item in the collection;

automatically calculating a disposal time for each respective collection of items based on the age of the at least one item in the respective collection of items and the category of the at least one item in the respective collection of items;

recording, in a particular predetermined data field in the storage area which relates to a particular collection of items, details of the legal proceeding search terms in use at a date of destruction being determined using the disposal time, of the particular collection of items;

determining, using the legal proceeding search terms, whether the particular collection of items is relevant to the legal proceedings; and preserving the particular collection of items when the particular collection of items is determined to be relevant to the legal proceedings.

8. The archiving method of claim 7, wherein the search criteria comprise keywords or a Boolean string comprising a one or more Boolean operators and a plurality of keywords.

9. The archiving method of claim 8, wherein the document search controller automatically derives the keywords or the Boolean string from search information provided by a user.

10. The archiving method of claim 7, wherein the search criteria include at least one criterion related to at least one of said pre-determined data fields, and wherein said document search controller is configured to search only the pre-determined data fields of said storage areas of said data store to which the at least one criterion relates.

11. The archiving method of claim 7, wherein
automatically calculating the disposal time for the collection of items is further based on a recommended retention period of items in the collection.

12. The archiving method of claim 11, wherein the pre-determined data fields include a responsible person field for each collection that relates to a person responsible of at least one item in the collection, and wherein the method includes automatically notifying the person responsible when destruction of the collection becomes appropriate based on the calculated disposal time for the collection.

13. A non-transitory computer-readable medium storing computer software for enabling searching for collections of items, the computer software comprising:
executable code that interacts with an archiving system, the archiving system including:
a data store having a plurality of storage areas, each of which relates to a respective collection of items and includes a plurality of pre-determined data fields, each for storing a particular type of information;
an input device having a display unit, an input unit and a processing unit, said display unit configured to display, in the form of an image on a screen of said display unit, an archived items collection management template having a template field corresponding to each of said pre-determined data fields;
an archiving controller that controls the transfer of data between said input device and said data store; and
a document search controller that searches content of said data store in accordance with search criteria;
the executable code that interacts with the archiving system including:
executable code that causes said display unit to display said archived items collection management template in respect of a particular one of said collections of items and to prompt a user to complete said template fields with data obtained by the user from manually reviewing that collection of items to capture information relevant to each of said template fields, said input unit receiving the data obtained by the user; and
executable code that causes said archiving controller to store, in the pre-determined data fields of a one of said storage areas of said data store corresponding to said collection of items, the data from said completed template fields, wherein said document search controller is able to search the pre-determined data fields of said storage areas of said data store corresponding to each of said collection of items to identify at least one of said collection of items which matches the search criteria,
wherein the plurality of pre-determined data fields include:
a data field for each respective collection of items that relates to the age of at least one item in the respective collection of items,
wherein the search criteria include legal proceeding search terms that relate to legal proceedings,
and wherein the computer software further comprises:
executable code that generates a category field for each collection that relates to the category of at least one item in the collection;
executable code that automatically calculates a disposal time for each respective collection of items based on the age of the at least one item in the respective collection of items and the category of the at least one item in the respective collection of items,
executable code that records in a particular predetermined data field in the storage area which relates to a particular collection of items, details of the legal proceeding search terms in use at a date of destruction, being determined using the disposal time, of the particular collection of items;
executable code that determines, using the legal proceeding search terms, whether the particular collection of items is relevant to the legal proceedings; and
executable code that preserves the particular collection of items when the particular collection of items is determined to be relevant to the legal proceedings.

14. The non-transitory computer readable medium of claim 13, wherein the search criteria include keywords or a Boolean string comprising a one or more Boolean operators and a plurality of keywords.

15. The non-transitory computer readable medium of claim 14, wherein executable code is provided that causes document search controller to automatically derive the keywords or the Boolean string from search information provided by a user.

16. The non-transitory computer readable medium of claim 13, wherein the search criteria include at least one criterion related to at least one of said pre-determined data fields, and wherein said document search controller is configured to search only the pre-determined data fields of said storage areas of said data store to which the at least one criterion relates.

17. The non-transitory computer readable medium of claim 13,
wherein the archiving system further includes:
a database of recommended retention periods for each category of item, and
wherein automatically calculating the disposal time for the collection of items is further based on the recommended retention period of items in the collection.

18. The non-transitory computer readable medium of claim 17, wherein the pre-determined data fields include a responsible person field for each collection that relates to a person responsible of at least one item in the collection, and wherein the archiving system includes a notification device that automatically notifies the person responsible when destruction of the collection becomes appropriate based on the calculated disposal time for the collection.

* * * * *